United States Patent
Collins

(10) Patent No.: US 9,582,754 B1
(45) Date of Patent: Feb. 28, 2017

(54) ADAPTIVE FEED FORWARD METHOD FOR TEMPERATURE CONTROL

(71) Applicant: Roger Collins, Boca Raton, FL (US)

(72) Inventor: Roger Collins, Boca Raton, FL (US)

( * ) Notice: Subject to any disclaimer, the term of this patent is extended or adjusted under 35 U.S.C. 154(b) by 0 days.

(21) Appl. No.: 15/156,383

(22) Filed: May 17, 2016

(51) Int. Cl.
 G06F 15/18 (2006.01)
 G06N 3/08 (2006.01)
 G05B 15/02 (2006.01)

(52) U.S. Cl.
 CPC ............. *G06N 3/08* (2013.01); *G05B 15/02* (2013.01); *G05B 2219/50333* (2013.01)

(58) Field of Classification Search
 USPC .......................................................... 706/25
 See application file for complete search history.

(56) References Cited

U.S. PATENT DOCUMENTS

| | | | |
|---|---|---|---|
| 4,319,320 | A | 3/1982 | Sato et al. |
| 4,768,143 | A | 8/1988 | Lane et al. |
| 5,099,442 | A | 3/1992 | Furuta et al. |
| 5,130,920 | A | 7/1992 | Gebo |
| 5,541,833 | A | 7/1996 | Bristol et al. |
| 5,687,077 | A | 11/1997 | Gough, Jr. |
| 6,736,120 | B2 | 5/2004 | Surnilla |
| 6,874,490 | B2 | 4/2005 | Surnilla |

(Continued)

FOREIGN PATENT DOCUMENTS

| | | |
|---|---|---|
| EP | 0 417 782 A2 | 3/1991 |
| EP | 0 915 301 A2 | 12/1999 |
| EP | 2866117 A1 | 4/2015 |

OTHER PUBLICATIONS

Low-Cost High-Efficiency Discrete Current Sensing Method Using Bypass Switch for PV Systems Daniel Thena Thayalan; Hwa-Seok Lee; Joung-Hu Park IEEE Transactions on Instrumentation and Measurement Year: 2014, vol. 63, Issue: 4 pp. 769-780, DOI: 10.1109/TIM.2013.2285791 IEEE Journals & Magazines.*

Dynamic Demand Response Controller Based on Real-Time Retail Price for Residential Buildings Ji Hoon Yoon; Ross Baldick; Atila Novoselac IEEE Transactions on Smart Grid Year: 2014, vol. 5, Issue: 1 pp. 121-129, DOI: 10.1109/TSG.2013.2264970 IEEE Journals & Magazines.*

(Continued)

*Primary Examiner* — Michael B Holmes
(74) *Attorney, Agent, or Firm* — Jacqueline Tadros; Jacqueline Tadros, P.A.

(57) ABSTRACT

A method of temperature control for maintaining actual temperature at a set point uses a learning period from which to acquire parameters that are used to control temperature. The method defines a learning period as one complete oscillation of the actual temperature about the set temperature. During such an oscillation period, the actual temperature will have been exclusively above and below the set temperature for one segment each. The invention provides a method for adjusting a variable in order to maintain a process measurement at a predetermined constant value, the method defining a sample period, wherein the sample period is a period of time represented by a complete oscillation of the process measurement about the predetermined constant value and wherein the complete oscillation includes a first time period during which the adaptable measurement is continuously above the predetermined constant value and a second time period during which the adaptable measurement is continuously below the predetermined value and wherein the first time period and second time period occur substantially sequentially.

23 Claims, 6 Drawing Sheets

(56) References Cited

U.S. PATENT DOCUMENTS

| | | | |
|---|---|---|---|
| 7,012,538 B2* | 3/2006 | Peck | G01N 17/00 |
| | | | 219/505 |
| 7,109,446 B1 | 9/2006 | Cheng et al. | |
| 7,111,450 B2 | 9/2006 | Surnilla | |
| 7,966,104 B2 | 6/2011 | Srivastava et al. | |
| 8,140,139 B2* | 3/2012 | Grata | A61B 5/1112 |
| | | | 600/310 |
| 8,321,511 B1* | 11/2012 | Friend | G06F 17/30575 |
| | | | 709/206 |
| 8,680,440 B2* | 3/2014 | Cohen | A61B 5/1112 |
| | | | 219/486 |
| 8,954,512 B2* | 2/2015 | Friend | G06F 17/30575 |
| | | | 709/206 |
| 9,037,206 B2* | 5/2015 | Grata | A61B 5/1112 |
| | | | 600/310 |
| 2002/0121333 A1 | 9/2002 | Sofer et al. | |
| 2006/0123554 A1 | 6/2006 | Kerle | |
| 2014/0224767 A1 | 8/2014 | Merry et al. | |

OTHER PUBLICATIONS

DWT based repetitive controller for tracking of periodic reference signal Ujjwal Mondal; Anindita Sengupta; Rajeev R. Pathak Proceedings of The 2014 International Conference on Control, Instrumentation, Energy and Communication (CIEC) Year: 2014 pp. 17-20, DOI: 10.1109/CIEC.2014.6959041 IEEE Conference Publications.*

Model-free periodic adaptive control for a class of SISO nonlinear discrete-time systems Ronghu Chi; Zhongsheng Hou IEEE ICCA 2010 Year: 2010 pp. 1623-1628, DOI: 10.1109/ICCA.2010.5524333 IEEE Conference Publications.*

EE392m: Control Engineering Methods for Industry Stanford University, Winter Quarter 2002-2003 Dimitry Gorinevsky www.stanford.edu/class/ee392m/.

Adaptive Feedforward Control for Periodic Disturbance Rejection With Application to Machining Processes by A.R. Kashani and J.W. Sutherland, Dec. 1995.

* cited by examiner

ADAPTIVE FEED FORWARD METHOD FOR TEMPERATURE CONTROL

BACKGROUND OF THE INVENTION

1. Field of the Invention

The present disclosure relates generally to a method for controlling temperature. More particularly, the invention relates to an adaptive feed forward method for PID temperature control in the context of a smoker controller. The inventive method improves temperature control performance by adjusting feed forward parameters depending on smoker controller output and process response over time.

2. Description of the Related Art

A PID controller, also known as a proportional-integral-derivative controller, provides a versatile feedback compensator structure that improves system performance. A PID controller is a control loop feedback mechanism commonly used in industrial control systems. A PID controller continuously calculates an error value as the difference between a measured process variable and a desired set point. A PID controller responds to error signals and attempts to correct errors where the system over or undershoots a set point. Thus, the controller attempts to minimize the error over time by adjustment of a control variable. The set point is where you would like the measurement to be. Error is defined as the difference between set point and measurement.

Error=Set Point−Measurement

The variable being adjusted is called the manipulated variable, which usually is equal to the output of the controller. Thus, the output of PID controllers will change in response to a change in measurement or set point.

PID controllers are designed to eliminate the need for continuous operator attention. For instance, cruise control in a car and a house thermostat are common examples of how controllers are used to automatically adjust some variable to hold the measurement (or process variable) at the set point.

In a closed loop system, the tracking error is the difference between the desired input value and the actual output value. Typically, the value of the tracking error will be sent to the PID controller, and the controller computes both the derivative and the integral of the tracking error. The control signal is equal to the proportional gain multiplied by the tracking error plus the integral gain multiplied by the integral of the error plus the derivative gain multiplied by the derivative of the error.

A proportional controller will have the effect of reducing the rise time and will reduce but never eliminate the steady state error.

An integral controller will have the effect of eliminating the steady-state error for a constant or step input, but it may make the transient response slower.

A derivative controller will have the effect of increasing the stability of the system, reducing the overshoot, and improving the transient response.

The proportional, integral and derivative parameters of a PID controller can be modified or tuned to deal with specific process requirements.

In the framework of a PID controller, P (proportional gain) accounts for the present values of the error. That is the variance between the set point and the current process temperature. For example, if the error is large and positive the control variable will be large and negative). I (integral gain) accounts for past values of the error. That is, the previous variance from the set point. For example, if the output is not sufficient to reduce the size of the error, the control variable will accumulate over time, causing the controller to apply a stronger action. D (derivative gain) accounts for possible future values of the error, based on its current rate of change. That is, the predicted future variance based on previous and current variance.

Adaptive control is the method used by a controller that adapts to a controlled system with parameters that vary, or are initially uncertain.

It is noted that the temperature indicated on the controller display is only the temperature measured by the temperature sensor and may not be a true indication of the actual temperature. In the context of temperature control, having an accurate temperature measurement and the ability to maintain a constant temperature whether using a barbecue, a batch oven or continuous oven is key to successful and quality temperature control.

Thus, process and temperature controllers provide useful tools to maintain the actual temperature at a set point despite disturbances that may vary the temperature from the ideal set point. Process and temperature controllers are powerful process control tools that take a signal from a temperature device, such as a thermocouple or other sensor and maintain a set point using an output signal.

It is known to control temperature using an adjustment input. U.S. Pat. No. 5,099,442 to Furuta et al. discloses a temperature control apparatus of a learning type for a furnace that runs repetitively with a certain operating pattern of temperature change with time. The apparatus has a dual system model with respect to an enlarged system consisting of the furnace and its controller. For each cycle of the repetition of the certain operating pattern, adjustment input is calculated by using the dual system model and the error between the preset temperature values for the pattern and the actual inside temperatures of the furnace which adjustment input is applied to the enlarged system to cause the inside temperatures to track the preset temperature values. After each cycle of operation, the adjustment input is renewed using the latest value of the above error.

U.S. Pat. No. 4,193,320 (to Sato et al.) teaches a system and method for the adaptive control of a process in which a feed forward control signal corresponding to a process demand is calculated according to a predetermined algebraic function, while a feedback correction signal is calculated on the basis of an error of a process feedback signal indicative of an error of a controlled variable from a predetermined setting, and the controlled variable of the process is controlled on the basis of the sum of these two signals. The adaptive control is such that, when a set point of the function deviates from the actual process demand, a value corresponding to the error appears in the feedback correction signal, and this value is used for automatically modifying the function itself to ensure the adaptive control of the process. A determination is made whether or not the process is in the steady state and when steady state operation is determined, the function of the feed forward control signal is modified.

In the context of a smoker controller, it is desirable to achieve precise temperature control. Thus it is desirable to implement an improved temperature control method using an improved adaptive feed-forward method with a PID temperature controller for regulating temperature control.

SUMMARY OF THE INVENTION

In accordance with the present invention, a temperature controller that uses an adaptive feed-forward method for regulating temperature control is disclosed. In one embodiment, the invention teaches a method of adapting the feed forward element to a PID controller. Thus in this embodiment, the invention combines control methods using a PID controller with an adaptive feed forward method to more effectively effectuate temperature control.

The method of the invention uses a learning period from which to acquire the parameters that are used to control temperature. In this context, the method defines a learning period as one complete oscillation of the actual temperature about the set temperature. During such an oscillation, the actual temperature will have been exclusively above and below the set temperature for one segment each. Such a learning period ensures that learning occurs over a stable period with a balance of process inputs and outputs. Temperature samples are taken every second.

The invention provides a method for adjusting a variable in order to maintain a process measurement at a predetermined constant value, the method comprising, including, or consisting of defining a sample period, wherein the sample period is a period of time represented by a complete oscillation of the process measurement about the predetermined constant value and wherein the complete oscillation includes a first time period during which the adaptable measurement is continuously above the predetermined constant value and a second time period during which the adaptable measurement is continuously below the predetermined value and wherein the first time period and second time period occur substantially sequentially.

In one embodiment, a temperature controller maintains the blower duty cycle using a modulation technique to encode the duty cycle into a pulsing signal such as pulse width modulation (PWM). The method of the invention controls the "on time" of the PWM signal to control the blower duty cycle and control blower output. The term blower duty cycle describes the proportion of "on" time to the regular interval or "period" of time. Blower duty cycle is thus typically expressed in percent. For example, 100% means that the blower duty cycle is fully on. Thus, when the blower duty cycle is at 100%, the power applied during each pulse period is 100%. At 50%, the power applied during each pulse period is 50%, etcetera.

The adaptive feed forward method of the invention does not wait until there is an error recorded, before registering the blower duty cycle. Error is the difference between a set point temperature and a process value temperature as measured by a temperature probe. Thus, the adaptive feed forward method estimates the blower duty cycle or output that is required to be applied to maintain the set temperature and applies this method without the need to record any error value. The result of this inventive adaptive feed forward method is a steadier control at the desired set temperature.

In the context of the invention, the following terms are defined as indicated in the glossary herein.

Glossary:
Average Output (OA) average output over the learning period
Average Process Value (PVA) average process value over the learning period
Dead Zone is when the Process Value (PV) is substantially equal to the Set Point (SP)
Discrete Time Period is the time period during which one temperature reading and one output reading is taken.
Error (E) is the difference between the process value (PV) and the set point (SP)
Feed Forward (FF) is the output that the controller will produce if there is no error and no history of error
Learned Feed Forward (LFF) is the output that the controller will produce as a result of using the adaptive feed forward method
Learning Period (LP) is a continuous period of time that begins when the process value (PV) changes from being equal to the set point (SP) and continues to when the process value (PV) equals the set point (SP) and thereafter changes in a direction opposite the direction at the start of the learning period and is either above or below the set point (SP) and ends when the process value (PV) becomes equal to the set point (SP) again.
Oscillation is when the process value (PV) is either above or below the Set Point (SP)
Output (O) is the blower output or blower duty cycle as determined by the controller
Oscillation Period (OP) may be used interchangeably with Learning Period (LP)
Process Value (PV) is the actual temperature
Set Point (SP) is the desired temperature as set on a controller.
Sum Output (Sum O) sum of the output taken over the learning period
Sum Process Value (Sum PV) sum of the process value taken over the learning period
Total Learning Period (TLP) is the total number of learning periods (LP) or oscillation period (OP) used to determine the learned feed forward parameter (LFF)

During the Learning Period (LP), the sum of the output (Sum O), and the sum of the process value (Sum PV) within each discrete time period is calculated. It is appreciated that an output value is defined as the value of the output (O).

The method of the present invention utilizes the average output (OA) over the learning period (LP) to estimate the output (O) required to maintain the average process value (PVA) over the learning period (LP).

In addition, the present invention utilizes the average output (OA) over the learning period (LP) to estimate the output (O) needed to maintain the process value (PV) at the average PV (PVA) during the learning period (LP). Then, extrapolation is applied to estimate the output needed to maintain the set point (SP), such estimate being the learned feed forward parameter (LFF). That is:

$$LFF = [(OA) \times (SP)] \div PVA$$

Both the average output (OA) and average process value (PVA) are calculated over the same learning period (LP) and utilize the same number of readings or samples taken every discrete time period. For example, the discrete time period may be one second, such that the readings or samples are taken once every second during the learning period (LP). Thus, the learned feed forward parameter (LFF) is determined at the end of the learning period (LP) by dividing the sum of the output (Sum O) during the learning period (LP) by the sum of the process value (Sum PV) during the learning period (LP) and multiplying by the set point (SP). That is:

$$LFF = [(Sum\ O) \div (Sum\ PV)](SP)$$

Thus, the learning method of the invention creates a learning period (LP) with a balance of process inputs, namely (O), (Sum O) and responses to those inputs, namely (PV), (Sum PV).

An aspect of the invention is that it allows a user to control temperature fluctuations so that the actual temperature or process value can more closely approximate the desired set temperature.

An object of the learning method of the invention is that it allows the controller to maintain a more stable and even temperature while in use for better and more predictable results.

An advantage of the adaptive learning method of the invention is that it improves temperature controller performance by adjusting the feed-forward parameter as learned from tracked controller output and process responses over time.

Another advantage of the learning method of the invention is that it does not wait until there is an error recorded, before registering the blower duty cycle. Thus, the adaptive feed forward method estimates the blower duty cycle or output that is required to be applied to maintain the set temperature and applies this method without the need to record any error value.

These and other aspects and advantages of the present disclosure will become apparent from the following detailed description of preferred embodiments of the invention considered in conjunction with the accompanying drawings, in which like drawings represent like components. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
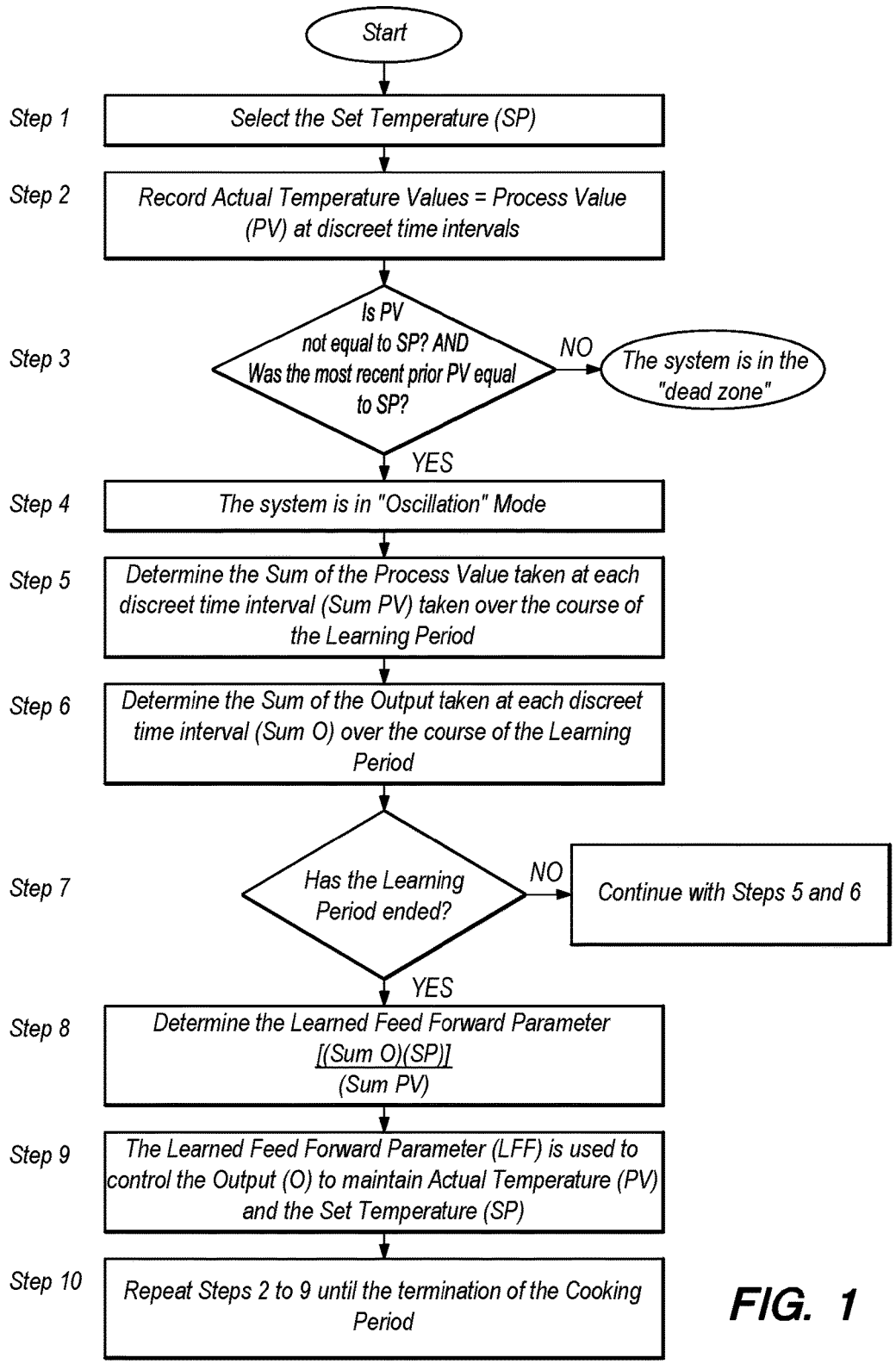
FIG. 1 is a flow chart illustrating the adaptive feed forward learning method of the invention to maintain actual temperature at the desired set temperature.

Referring now to FIGS. 1-6, there are shown illustrations of the adaptive feed forward learning method of the invention. Although in the context of the invention, the adaptive feed forward learning method is illustrated in use for temperature control, it is appreciated that the method of the invention may be used to control other functions or parameters.

The method is a method of temperature control for maintaining actual temperature at a set point (SP) comprising or consisting of setting a temperature controller 10 at the set point (SP); taking temperature readings of the actual temperature (PV) at discrete time periods over the course of a learning period (LP); determining the sum of the actual temperatures (Sum PV) taken within each of the discrete time periods over the course of the learning period (LP), determining output (O) within each discrete time period over the course of the learning period (LP); determining the sum of the output (Sum O) within each discrete time period over the course of the learning period (LP); determining a learned feed forward (LFF) parameter, wherein the learned feed forward (LFF) parameter is a quotient determined by a proportion of a first part, wherein the first part is the product of the set point (SP) and the sum of the output (Sum O) over the course of the learning period (LP), and a second part, wherein the second part is the sum of the actual temperature values (Sum PV) over the course of the learning period (LP); and applying the learned feed forward (LFF) parameter in order to maintain the actual temperature (PV) at the set point (SP).

The invention teaches that the learning period (LP) is a period of time represented by one complete oscillation of the actual temperature (PV) about the set temperature (SP). A learning period (LP) comprises or consists of or includes two consecutive time periods, namely, a first time period 20 during which the process value (PV) is continuously above the set point (SP) and a second time period 22 during which the process value (PV) is continuously below the set point (SP).

The invention further discloses a system for calculating a learned feed forward (LFF) parameter to offset an error value in order to regulate temperature by maintaining an actual temperature (PV) at a set point (SP), the system comprising a temperature controller 10, configured at a set point (SP); a temperature reader 12 configured to measure the actual temperature (PV) at fixed intervals; a blower 16 configured to produce the output (O) at each of the fixed intervals, wherein the output (O) is blower duty cycle; a central processing unit 18 configured to calculate the learned feed forward (LFF) parameter for regulating blower circuitry in order to control the output (O) for approximating the actual temperature (PV) to the set temperature (SP), wherein the learned feed forward (LFF) parameter is the output (O) that the temperature controller 10 would produce if there were no error and no history of error, and wherein the learned feed forward (LFF) parameter is a quotient determined by a proportion of a first part, wherein the first part is the product of the set point (SP) and the sum of the output (sum O) over the course of a learning period (LP), and a second part, wherein the second part is the sum of the actual temperature (sum PV) over the course of the learning period (LP); and a central processing unit 18, and means for applying the learned feed forward (LFF) parameter to the output (O) in order to maintain the actual temperature (PV) substantially at the set point (SP), wherein the means for applying the learned feed forward (LFF) parameter is the central processing unit 18 that utilizes the method of the invention to control the blower duty cycle of the blower 16. In one embodiment, the central processing unit 18 comprises a non transitory computer readable media. It is understood in the art that output (O) is generally controlled by controlling the blower's 16 power line (not shown).

Another embodiment of the invention discloses a temperature controller 10 for maintaining an actual temperature (PV) at a set point (SP) comprising a central processing unit 18 configured to calculate a learned feed forward (LFF) parameter, wherein the learned feed forward (LFF) parameter is a quotient determined by a proportion of a first part, wherein the first part is the product of the set point (SP) and the sum of the output (sum O) over the course of a learning period (LP), and a second part, wherein the second part is the sum of the actual temperature (sum PV) over the course of a learning period (LP).

Referring now to FIG. 1 there is shown a flow chart illustrating the adaptive feed forward learning method of the invention to maintain actual temperature PV at a desired set temperature SP. It is noted that the steps within the method as illustrated by the flow chart are executed every second.

Initially the desired set temperature (SP) is selected. An actual temperature (PV) is recorded thereafter. When the actual temperature (PV) is found to be not substantially equal to the set temperature (SP) and the most recent prior actual temperature (PV) was substantially equal to the set temperature (SP), then the system is determined to be "in oscillation". The system is in the "dead zone" if the actual temperature (PV) is equal to the set temperature (SP). A recording of the actual temperature (PV) is taken every second over the course of a learning period (LP). The sum of the actual temperature (PV) during the learning period (Sum PV) is determined. A blower output or blower duty cycle (O) as determined by a controller 10 is recorded every second during the same learning period (LP). The sum of the output (O) during the learning period (LP) or (Sum O) is determined. At the end of the learning period (LP) a learned feed forward parameter (LFF) is determined using the product of the sum of the output during the learning period (Sum O) and the set temperature (SP) divided by the sum of the actual temperature during the learning period (Sum PV).

Thus, $$LFF=[(Sum\ O)\times(SP)]\div(Sum\ PV)$$

The steps in the flow chart are executed every second over the course of the learning period (LP) and repeated thereafter for every subsequent learning period (LP) during the course of a cook. Thus, a learned feed forward parameter (LFF) as determined from the inventive adaptive learned method is utilized to control output (O) and to more accurately maintain the actual temperature value (PV) at the set temperature value (SP).

It is preferable to dampen any changes to the learned feed forward (LFF) parameter so that no single oscillation can dramatically affect a feed forward (FF) value. In a preferred embodiment, the (LFF) will be capped at a maximum of two hundred percent of the (FF) value, or 2 (FF) and (LFF) will not be allowed to fall below a minimum of fifty percent of the (FF) value, or ½ (FF). For example if (FF) is 20% and the (LFF) is determined to be 50%, it is preferable to dampen the (LFF) so that it is at a max of 40% or 2(20%) for that learning period in order to maintain a greater control and to avoid large temperature swings. Similarly, if LFF is determined to be 5%, it is preferable to modify LFF so that it is at a minimum of 10% or ½(20%) for the learning period (LP) in order to avoid large temperature swings. Thus, the feed forward parameter (FF) is modified to equal learned feed forward parameter (LFF) at the end of each learning period (LP).

Figure 2:
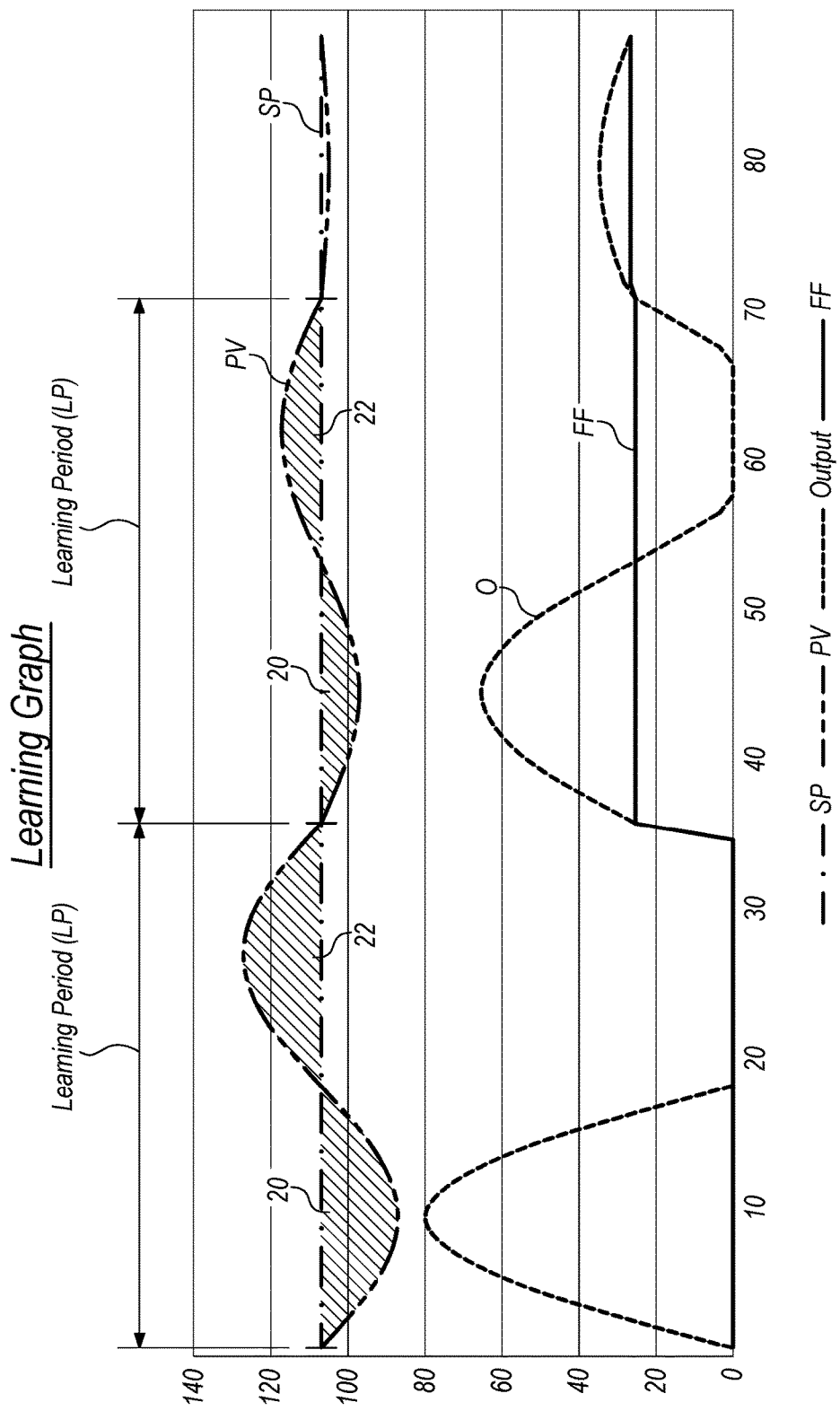
FIG. 2 is a time-temperature graph charting the temperature fluctuation over several learning periods using the learning method of the invention.

Referring now to FIG. 2, there is shown a time-temperature graph charting the temperature fluctuation over several learning periods (LP) when using the learning method of the invention. In this example, the set point (SP) is about 107 degrees Celsius. As illustrated, the (SP) is constant throughout the cooking process.

The process value (PV) fluctuates above and below the set point (SP). As shown, the (PV) more closely approximates (SP) as the process continues. A learning period (LP) in this illustration is shown to be about 31 seconds. That is, the (PV) oscillates about the (SP) for a period of 31 seconds. As show, during the first 31 seconds, the process value (PV) is below the set point (SP) and above the set point (SP) for one continuous segment each, namely 20 and 22.

A learning period (LP) comprises of, consists of, or includes a first time period 20, in which (PV) is continuously below the (SP) and a second time period, 22, in which (PV) is continuously above (SP), where the first time period, 20 and the second time period, 22 occur sequentially and are substantially consecutive. A series of learning periods (LP) may be used to determine the learned feed forward (LFF) parameter. The blower output (O), or blower duty cycle as determined by the controller 10 is recorded every second for each learning period (LP).

As illustrated in FIG. 2, the initial learning period is 31 seconds. The sum of the output (O) during the total learning period (TLP) or (Sum O) is determined. At the end of the total learning period (TLP) the Learned Feed Forward parameter, LFF is determined using the product of the sum of the output during the learning period (Sum O) and the set temperature, SP, divided by the sum of the actual temperature during the learning period, (Sum PV).

Thus, $$LFF=[(Sum\ O)\times SP]\div(Sum\ PV)$$

Figure 3:
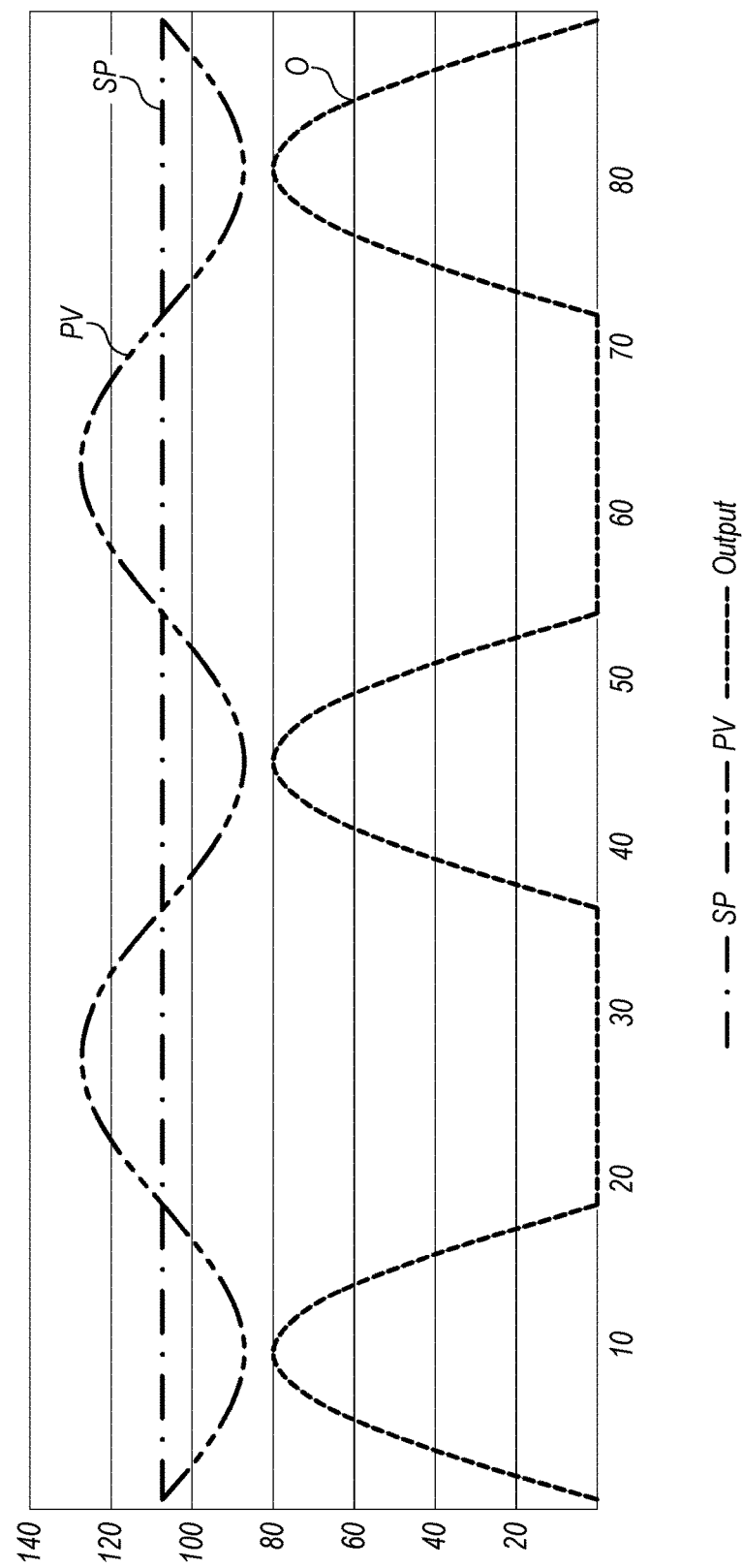
FIG. 3 is a time-temperature graph charting the temperature fluctuation over several learning periods using a prior art PID temperature controller that has not incorporated the learning method of the invention.

FIG. 3 is a time-temperature graph charting the temperature fluctuation over several learning periods (LP) without using the learned feed forward (LFF) parameter. As shown in this example, the blower output (O), or blower duty cycle as determined by the controller 10 is not subject to modification by the learned feed forward (LFF) parameter. A greater output (O) is required as shown in FIG. 3 to maintain or approximate the process value (PV) to the set temperature (SP). FIG. 2 shows the affect of the learned feed forward (LFF) parameter has on output (O). As the learned feed forward (LFF) parameter is incorporated as shown in FIG. 2, less output (O) is required to maintain or approximate the process value (PV) to the set temperature (SP).

Figure 4:
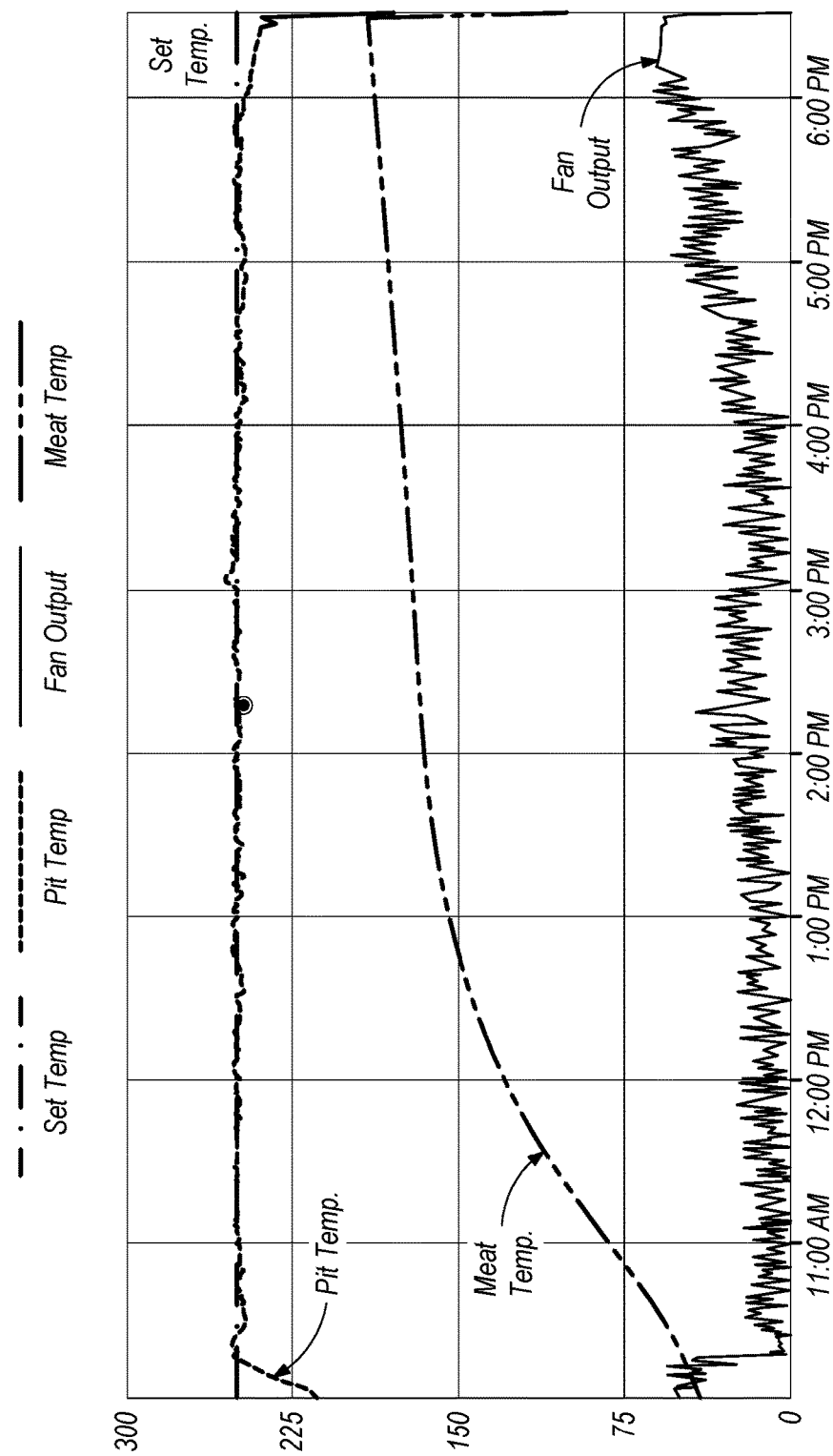
FIG. 4 is a time temperature graph charting meat temperature, pit temperature, and set temperature during a cooking period using the adaptive feed forward learning method of the invention.

FIG. 4 is a time temperature graph charting meat temperature, pit temperature, set temperature over a seven to eight hour cooking period using the adaptive learned feed forward method of the invention. In this example, the inventive method allowed the temperature controller 10 to adapt or learn to apply a higher feed forward parameter over the course of numerous learning periods during the cooking period. In this example, there were approximately forty learning periods over the course of a six hour cook. Thus, we find that from 5:00 to 6:00 pm the blower output or blower duty cycle is higher than between 11:00 am-12:00 pm. As illustrated in this figure, the process value (PV) very closely approximates the set point (SP).

Figure 5:
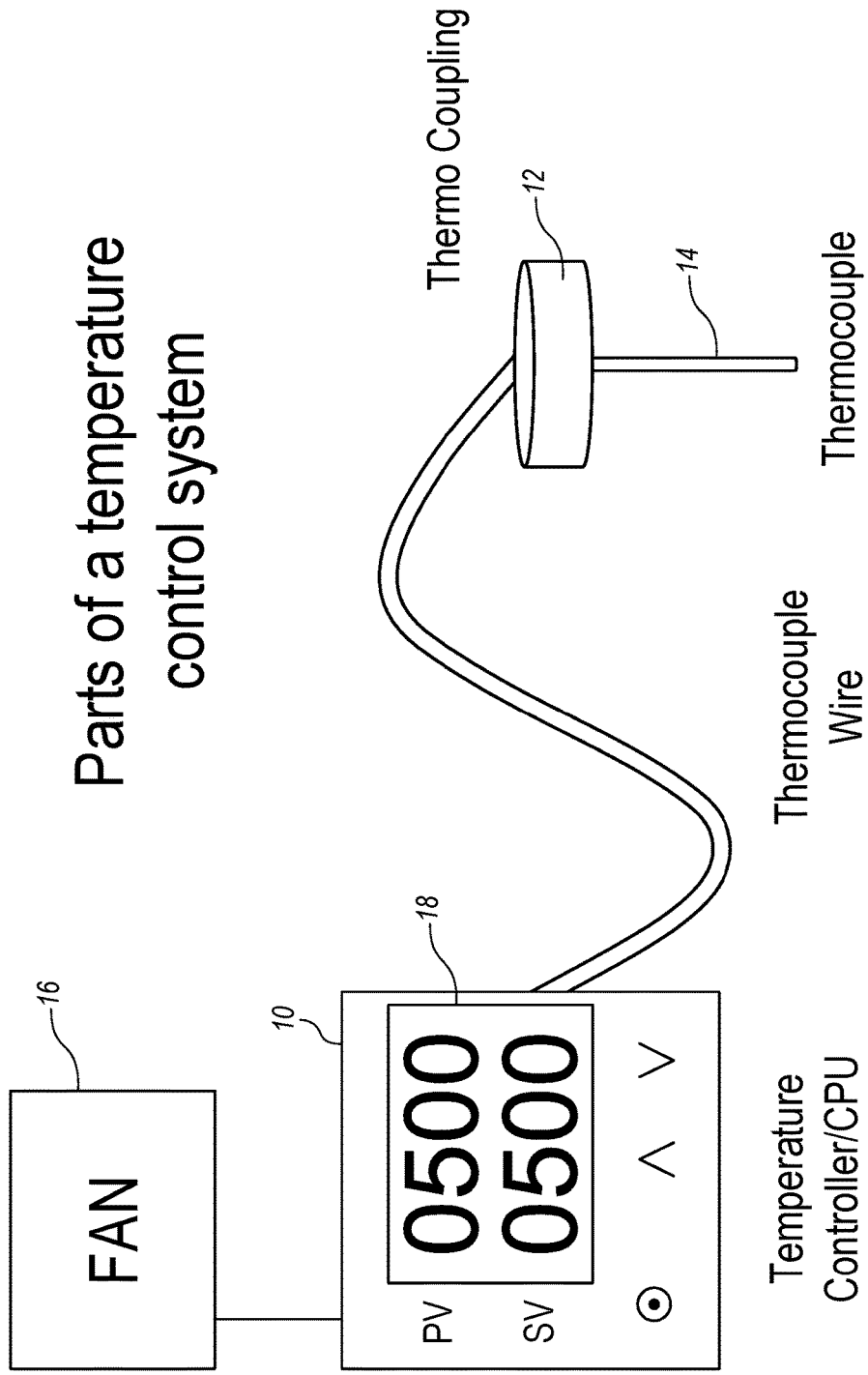
FIG. 5 is an illustration of a temperature controller in use with a temperature probe and a thermocouple.

FIG. 5 is an illustration of a temperature controller 10 in use with a temperature reader 12, thermocouple 14, blower 16, and central processing unit 18.

Thus, the temperature controller 10 includes the central processing unit 18 configured to calculate the learned feed forward parameter (LFF), wherein the learned feed forward parameter (LFF) is a quotient determined by a proportion of a first part, wherein the first part is the product of the set point (SP) and the sum of the output (sum O) over the course of a learning period (LP), and a second part, wherein the second part is the sum of the actual temperature (sum PV) over the course of a learning period (LP). The temperature controller 10 maintains the actual temperature (PV) at the set point (PV)

Figure 6:
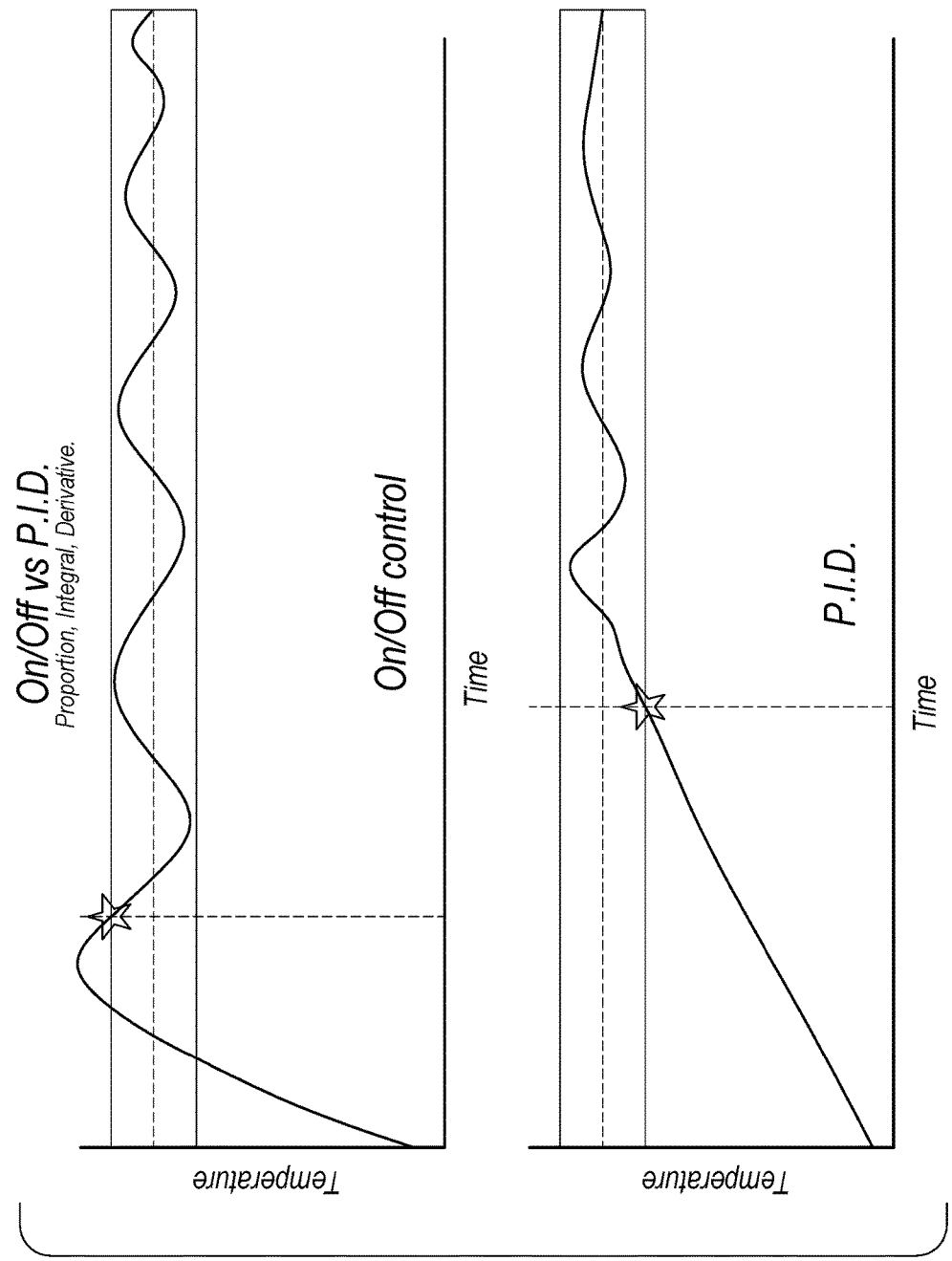
FIG. 6 is a comparison of an ON/OFF system versus a PID temperature controller.

FIG. 6 is a comparison of an ON/OFF system versus a PID temperature controller. Thus, the time temperature graphs illustrate the difference between using an on/off blower output to maintain temperature control versus blower output using a traditional PID temperature controller. As shown, the PV more closely approximates the SP using a PID temperature controller. In a traditional PID controller, FF is zero.

Thus, while there has been shown and described, fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements and/or method steps which perform substantially the same function, in substantially the same way, to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore to be limited only as indicated by the scope of the claims appended hereto.

What is claimed is:

1. A method of temperature control for maintaining actual temperature at a set point comprising the steps of:
    setting a temperature controller at the set point;
    taking temperature readings of the actual temperature at discrete time periods over the course of a learning period;
    determining the sum of the actual temperatures taken within each of the discrete time periods over the course of the learning period;
    determining output within each discrete time period over the course of the learning period;
    determining the sum of the output within each discrete time period over the course of the learning period;
    determining a learned feed forward parameter, wherein the learned feed forward parameter is a quotient determined by a proportion of a first part, wherein the first part is the product of the set point and the sum of the output over the course of the learning period, and a second part, wherein the second part is the sum of the actual temperature values over the course of the learning period; and
    applying the learned feed forward parameter to modify the output in order to maintain the actual temperature at the set point.

2. The method of claim 1, wherein each of the discrete time period is substantially a one second period of time.

3. The method of claim 1, wherein the learning period includes a first time period in which the actual temperature is continuously below the set point and a second time period in which the actual temperature is continuously above the set point and wherein the first time period and the second time period occur sequentially.

4. The method of claim 1, wherein the learning period includes a first time period in which the actual temperature is continuously above the set point and a second time period in which actual temperature is continuously below the set point and wherein the first time period and the second time period occur sequentially.

5. The method of claim 1 wherein the learning period includes at least one first time period wherein the actual temperature is continuously above the set point and at least one second time period wherein the actual temperature is continuously below the set point.

6. The method of claim 1, further comprising a plurality of learning periods.

7. The method of claim 1, wherein a feed forward parameter is initially set to a factory default setting.

8. The method of claim 1, wherein the temperature controller is a PID temperature controller.

9. A system for calculating a learned feed forward parameter to apply to an output value in order to regulate temperature by maintaining an actual temperature at a set point, the system comprising:
    a temperature controller configured at a set point;
    a temperature reader configured to measure the actual temperature at fixed intervals;
    a blower configured to operate during each of the fixed intervals to provide an output at each of the fixed intervals, wherein the output is defined as a blower duty cycle; and
    a central processing unit configured to calculate the learned feed forward parameter for regulating the blower in order to control the output for approximating the actual temperature to the set temperature, wherein the learned feed forward parameter is the output that the temperature controller would produce if there were no error and no history of error, and wherein the learned feed forward parameter is a quotient determined by a proportion of a first part, wherein the first part is the product of the set point and the sum of the output over the course of a learning period, and a second part, wherein the second part is the sum of the actual temperature over the course of the learning period.

10. The system of claim 9, wherein the central processing unit applies the learned feed forward parameter to the output value to control the blower duty cycle in order to maintain the actual temperature substantially at the set point.

11. The system of claim 9, wherein the error value is the difference between the actual temperature and the set point.

12. The system of claim 9, wherein the central processing unit is included in the temperature controller.

13. The system of claim 9, wherein the temperature controller is a proportional integral derivative temperature controller for further calculating a proportional integral derivative feed forward parameter.

14. The system of claim 9, wherein the learning period includes a first time period in which the actual temperature is continuously below the set point and a second time period in which actual temperature is continuously above the set point and wherein the first time period and the second time period occur substantially sequentially.

15. The system of claim 9, wherein the learning period includes a first time period in which the actual temperature is continuously above the set point and a second time period in which the actual temperature is continuously below the set point and wherein the first time period and the second time period occur substantially sequentially.

16. The system of claim 9, wherein the actual temperature and blower output are each calculated once per second over the course of the learning period.

17. The system of claim 13, wherein the learned feed forward parameter is capped at a maximum of two hundred percent of the proportional integral derivative feed forward parameter.

18. The system of claim 13, wherein the learned feed forward parameter will not fall below a minimum of fifty percent of the proportional integral derivative feed forward parameter.

19. A temperature controller for maintaining an actual temperature at a set point comprising a central processing unit configured to calculate a learned feed forward parameter, wherein the learned feed forward parameter is a quotient determined by a proportion of a first part, wherein the first part is the product of the set point and the sum of the output over the course of a learning period, and a second part, wherein the second part is the sum of the actual temperature over the course of a learning period.

20. The temperature controller of claim 19, wherein the temperature controller is a proportional integral derivative temperature controller.

21. The temperature controller of claim 19, wherein the learning period is a time period within which the actual temperature is continuously above the set point and a second time period in which actual temperature is continuously below the set point and wherein the first time period and the second time period occur substantially sequentially.

22. The temperature controller of claim 20, wherein the one complete oscillation is a period within which the actual temperature is continuously below the set point and a second time period in which process value is continuously above the set point and wherein the first time period and the second time period occur substantially sequentially.

23. A method for adjusting a variable in order to maintain an adaptable measurement at a predetermined constant value, the method comprising:

defining a learning period, wherein the learning period is a period of time represented by a complete oscillation of the adaptable measurement about the predetermined constant value and wherein the complete oscillation includes a first time period during which the adaptable measurement is continuously above the predetermined constant value and a second time period during which the adaptable measurement is continuously below the predetermined value and wherein the first time period and second time period occur substantially sequentially.

* * * * *